(12) United States Patent
Schaub et al.

(10) Patent No.: US 12,107,361 B2
(45) Date of Patent: Oct. 1, 2024

(54) SECURABLE COMPUTER DATA CABLES AND PORTS

(71) Applicant: AT&T Intellectual Property I, L.P., Atlanta, GA (US)

(72) Inventors: Ryan Schaub, Norcross, GA (US); Barrett M. Kreiner, Woodstock, GA (US); Michael Spurlock, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 218 days.

(21) Appl. No.: 17/698,701

(22) Filed: Mar. 18, 2022

(65) Prior Publication Data
US 2023/0299531 A1    Sep. 21, 2023

(51) Int. Cl.
| | | |
|---|---|---|
| *H01R 13/44* | (2006.01) | |
| *G05B 15/02* | (2006.01) | |
| *H01R 13/639* | (2006.01) | |
| *H01R 13/703* | (2006.01) | |
| *H01R 43/26* | (2006.01) | |

(52) U.S. Cl.
CPC ............ *H01R 13/44* (2013.01); *G05B 15/02* (2013.01); *H01R 13/6397* (2013.01); *H01R 13/703* (2013.01); *H01R 43/26* (2013.01); *H01R 2201/06* (2013.01)

(58) Field of Classification Search
CPC .... H01R 13/44; H01R 13/6397; H01R 43/26; H01R 2201/06; G05B 15/02
USPC ........................................ 439/135, 352, 489
See application file for complete search history.

(56) References Cited

U.S. PATENT DOCUMENTS

| | | | | |
|---|---|---|---|---|
| 7,972,158 B2 * | 7/2011 | Wild | ................ | H01R 13/6277 439/352 |
| 8,206,172 B2 * | 6/2012 | Katagiri | ................ | B60L 50/16 439/352 |
| 8,251,734 B2 * | 8/2012 | Katagiri | ................ | B60L 53/65 439/372 |
| 8,678,847 B2 * | 3/2014 | Inoue | ................ | H01R 13/6275 439/352 |

(Continued)

OTHER PUBLICATIONS

"Dual-Role Products Swap Guidelines", Applied to: USB Type-C® Specification Release 2.1, May 2021, USB Type-C Engineering Change Notice, USB Implementers Forum, 2 pgs.

(Continued)

*Primary Examiner* — Gary F Paumen
(74) *Attorney, Agent, or Firm* — Guntin & Gust, PLC; Matthew Tropper

(57) ABSTRACT

Aspects of the subject disclosure may include, for example, a device comprising: a female port configured to receive a data connector, the data connector comprising a surface with a first opening; a first movable member disposed within the female port, the first movable member being configured such that as the data connector is moved into the female port a first portion of the first movable member enters into the first opening; and a first blocking member disposed within the female port, the first blocking member being configured to move to a first blocking position to block the first portion of the first movable member from exiting the first opening after the first portion of the first movable member has entered the first opening. Other embodiments are disclosed.

20 Claims, 8 Drawing Sheets

(56) References Cited

U.S. PATENT DOCUMENTS

| | | | | |
|---|---|---|---|---|
| 8,758,039 | B2* | 6/2014 | Ishida | B60L 53/16 439/372 |
| 8,823,486 | B2* | 9/2014 | Jung | B60L 53/16 439/352 |
| 2004/0198089 | A1* | 10/2004 | Turck | H01R 13/639 439/352 |
| 2012/0088382 | A1* | 4/2012 | Konchan | H01R 13/6397 439/153 |
| 2012/0234061 | A1* | 9/2012 | Inoue | H01R 13/6397 70/255 |
| 2013/0089999 | A1* | 4/2013 | Martin | H01R 13/6397 439/345 |
| 2014/0170890 | A1* | 6/2014 | Kurumizawa | H01R 13/6397 439/352 |
| 2015/0017824 | A1* | 1/2015 | Kung | H01R 13/443 439/148 |
| 2020/0412054 | A1* | 12/2020 | Yildiz | H01R 43/26 |

OTHER PUBLICATIONS

"Marked cable correction", Applied to: USB Type-C® Specification Release 2.1, May 2021, USB Type-C Engineering Change Notice, USB Implementers Forum, 2 pgs.

"Minimum Functional Cable Voltage Clarification", Applied to: USB Type-C Specification Release 2.1, May 2021, USB Type-C Engineering Change Notice, USB Implementers Forum, 3 pgs.

"Sinking Host-Sourcing Device Swap Clarifications", Applied to: USB Type-C® Specification Release 2.1, May 2021, USB Type-C Engineering Change Notice, USB Implementers Forum, 2 pgs.

"Try.SRC and Try.SNK Usage Clarifications", Applied to: USB Type-C® Specification Release 2.1, May 2021, USB Type-C Engineering Change Notice, USB Implementers Forum, 3 pgs.

"Universal Serial Bus Type-C Cable and Connector Specification", USB 3.0 Promoter Group, USB Type-C Cable and Connector Specification, Release 2.1, May 2021, 410 pgs.

"USB 2.0 and SS Termination Clarifications for USB4™ and AM UFPs", Applied to: USB Type-C® Specification Release 2.1, May 2021, USB Type-C Engineering Change Notice, USB Implementers Forum, 2 pgs.

"USB 3.0 Promoter Group: Apple Inc., HP Inc., Intel Corporation, Microsoft Corporation, Renesas, STMicroelectronics, and Texas Instruments", Release 2.1, USB Type-C Cable and Connector Specification, UBS 3.0 Promoter Group, Redlined Version, May 2021, 415 pgs.

"USB Type-C® Cable and Connector Specification Revision 2.1", https://usb.org/document-library/usb-type-cr-cable-and-connector-specification-revision-21, Jan. 19, 2022, 3 pgs.

"USB Type-C® Connector System Software Interface (UCSI) Specification", UCSI Specification, USB Promoter Group, Revision 2.0, Jan. 2022, 83 pgs.

"USB4™ VDO Response Clarification", Applied to: USB Type-C® Specification Release 2.1, May 2021, USB Type-C Engineering Change Notice, USB Implementers Forum, 16 pgs.

* cited by examiner

SECURABLE COMPUTER DATA CABLES AND PORTS

FIELD OF THE DISCLOSURE

The subject disclosure relates to securing of computer accessory cables and the ports that provide data and to securable data connector configurations.

BACKGROUND

The Universal Serial Bus (USB) is a well-known standard for computer environments. Originally, the USB 1.0 specification allowed for low power transfer, 5 volts, 1 amp, or 5 watts of power. As standards have progressed, the amount of voltage and amperage has steadily increased. The new USB Type-C® 2.1 standard supports up to 48 v, 5 A (240 w) connections that can be used for appliance-class device power/rapid battery recharging. Unexpected disconnects of cabling carrying this much power can lead to sparking, damage to either the cable or port, and may be a health and safety hazard. There is no securing/locking mechanism in the design of this type of connector/port.

The High-Definition Multimedia Interface (HDMI) is another standard for audio/video connections between devices that support audio/video encoded data, ethernet networking, and like USB 1.0, a limited amount of power. Device-device connectivity (HDMI-CEC) prevent secure media from being transmitted across insecure connection (even not allowing devices to turn on). There is no securing/locking mechanism in the design of this type of connector/port.

Ethernet cables, which carry data and in some configurations carry power (PoE), have a locking tab specifically designed to keep the connector secure in the port.

BRIEF DESCRIPTION OF THE DRAWINGS

Reference will now be made to the accompanying drawings, which are not necessarily drawn to scale, and wherein.

DETAILED DESCRIPTION

Figure 1A:
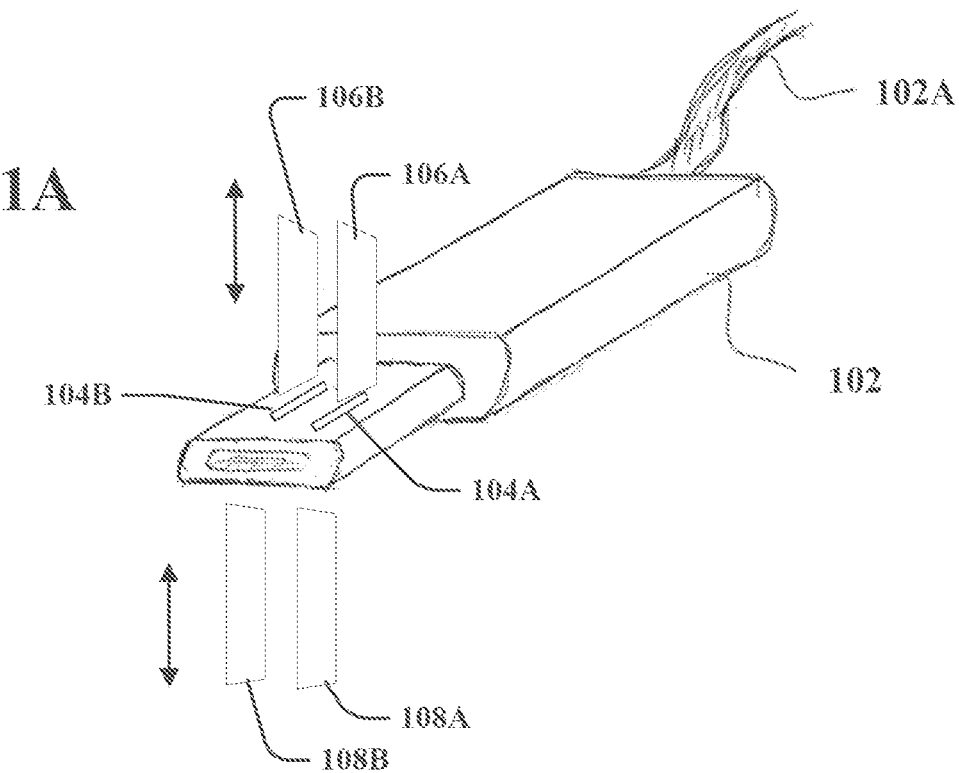
FIGS. 1A-1B are diagrams illustrating example, non-limiting embodiments of various data connector configurations.

The subject disclosure describes, among other things, illustrative embodiments for securing of computer accessory cables and the ports that provide data and to data connector configurations. Various embodiments can provide for: the ability to modify data cables ends such that they can be mechanically secured; and/or modification to the ports to be able to mechanically secure the cable in the port/block the port, detect the insertion/removal, and take behavior actions including activating/terminating data and power paths. In one example, data connector configurations that may or may not carry power can be provided. In one example, the configuration can be utilized for a female USB (Universal Serial Bus) port and a male USB connector. In one specific example, each of the female USB port and the male USB connector can conform to the USB Type-C® 2.1 standard. Other embodiments are described in the subject disclosure.

One or more aspects of the subject disclosure include a device comprising: a female port configured to receive a data connector, the data connector comprising a surface with a first opening; a first movable member disposed within the female port, the first movable member being configured such that as the data connector is moved into the female port a first portion of the first movable member enters into the first opening; and a first blocking member disposed within the female port, the first blocking member being configured to move to a first blocking position to block the first portion of the first movable member from exiting the first opening after the first portion of the first movable member has entered the first opening.

One or more aspects of the subject disclosure include a non-transitory machine-readable medium comprising executable instructions that, when executed by a processing system including a processor, facilitate performance of operations, the operations comprising: receiving a first signal from a detection mechanism disposed within a female port, the female port being configured to receive a data connector comprising a surface with an opening, the first signal indicating that the data connector has been inserted into the female port to a predetermined position; and responsive to receiving the first signal, sending to the female port a second signal, the female port comprising a locking member disposed therein, the locking member being activated by the second signal to cause a structure to be held within the opening, the activation of the locking member blocking removal of the data connector back out of the female port.

One or more aspects of the subject disclosure include a method comprising: determining, by a processing system including a processor, whether a male data connector has been inserted into a female port to a predetermined position, the male data connector comprising a surface with an opening, the determining resulting in a determination; responsive to the determination being that the male data connector has been inserted into the female port to the predetermined position, transmitting a lock signal to a lock actuator disposed with a cavity of the female port, the lock actuator being activated by the locking signal to cause a latch member to be held within the opening, the activation of the lock actuator blocking removal of the male data connector back out of the female port; receiving, by the processing system, an instruction to allow the removal of the male data connector from the female port; and responsive to receipt of the instruction, transmitting by the processing system a release signal to the lock actuator, the lock actuator being de-activated by the release signal, the de-activation of the lock actuator enabling removal of the male data connector from the female port.

Referring now to FIG. 1A, this is a diagram illustrating an example, non-limiting embodiment of a data connector configuration. More particularly, as seen in FIG. 1A, a vertical securable data connector 102 (including cable 102A) can include in an upper surface thereof one or more openings (such as holes, notches, and the like). In this example, two openings 104A, 104B are shown. In other examples any desired number of openings can be provided in the upper surface. The openings 104A, 104B can be located so as to receive therein corresponding structures 106A, 106B. The structures 106A, 106B can be part of a port into which the data connector 102 is inserted and the structures 106A, 106B can be operated (e.g., moved, locked, unlocked) as described herein. Further, data connector 102 can include in a lower surface thereof one or more openings (such as holes, notches, and the like). In this view, these two openings in the lower surface are not seen. In other examples any desired number of openings can be provided in the lower surface. The openings in the lower surface can be located so as to receive therein corresponding structures 108A, 108B. The structures 108A, 108B can be part of the port into which the data connector 102 is inserted and the structures 108A, 108B can be operated (e.g., moved, locked, unlocked) as described herein. In various examples, each of the openings can be any desired shape (e.g., linear, circular, oval, rectangular). In various examples, each of the corresponding structures can be any desired shape (e.g., linear, circular, oval, rectangular).

Figure 1B:
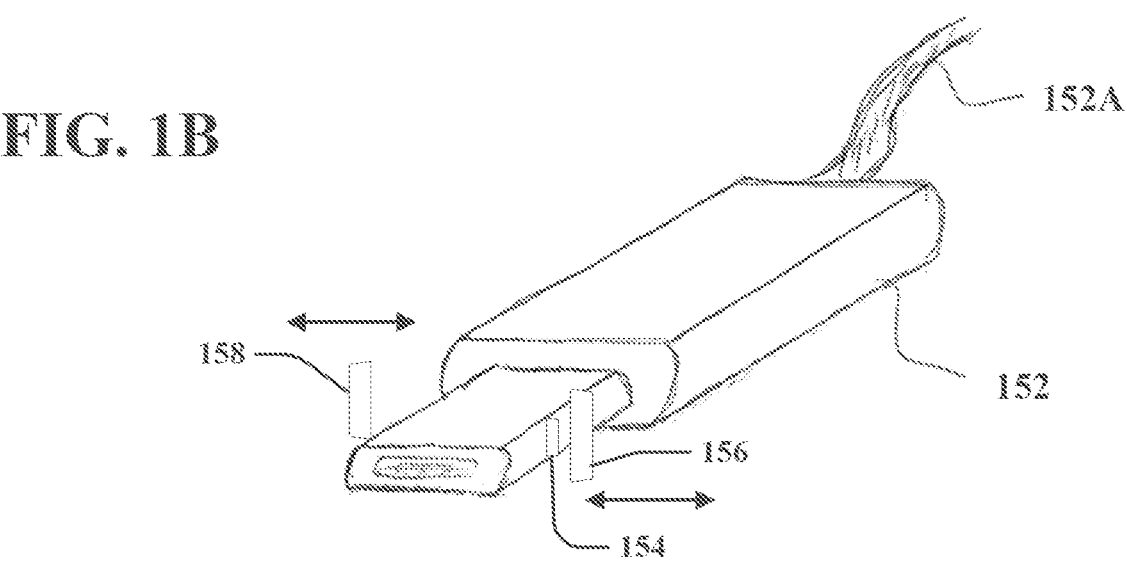

Referring now to FIG. 1B, this is a diagram illustrating an example, non-limiting embodiment of a data connector configuration. More particularly, as seen in FIG. 1B, a horizontal securable data connector 152 (including cable 152A) can include in a first side surface thereof one or more openings (such as holes, notches, and the like). In this example, one opening 154 is used. In other examples any desired number of openings can be provided in the first side surface. The openings 154 can be located so as to receive therein a corresponding structure 156. The structure 156 can be part of a port into which the data connector 152 is inserted and the structure 156 can be operated (e.g., moved, locked, unlocked) as described herein. Further, data connector 152 can include in a second side surface thereof one or more openings (such as holes, notches, and the like). In this example, one opening is used (not shown). In other examples any desired number of openings can be provided in the second side surface. The opening can be located so as to receive therein a corresponding structure 158. The structure 158 can be part of the port into which the data connector 152 is inserted and the structure 159 can be operated (e.g., moved, locked, unlocked) as described herein. In various examples, each of the openings can be any desired shape (e.g., linear, circular, oval, rectangular). In various examples, each of the corresponding structures can be any desired shape (e.g., linear, circular, oval, rectangular).

Figure 2A:
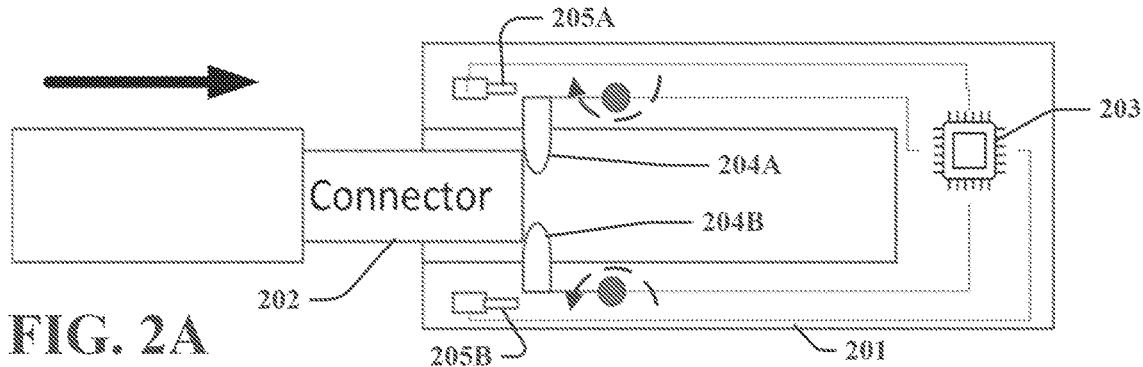
FIGS. 2A-2E are diagrams illustrating example, non-limiting embodiments of various data connector configurations.
Figure 2B:
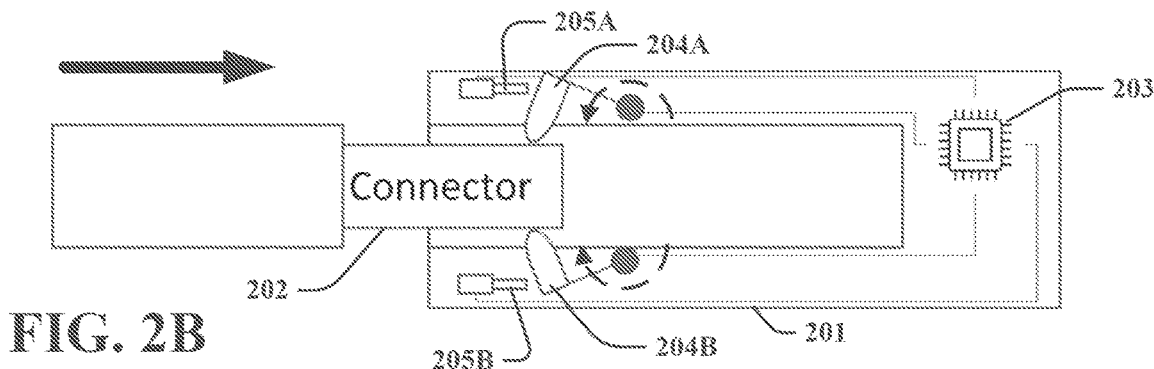
Figure 2C:
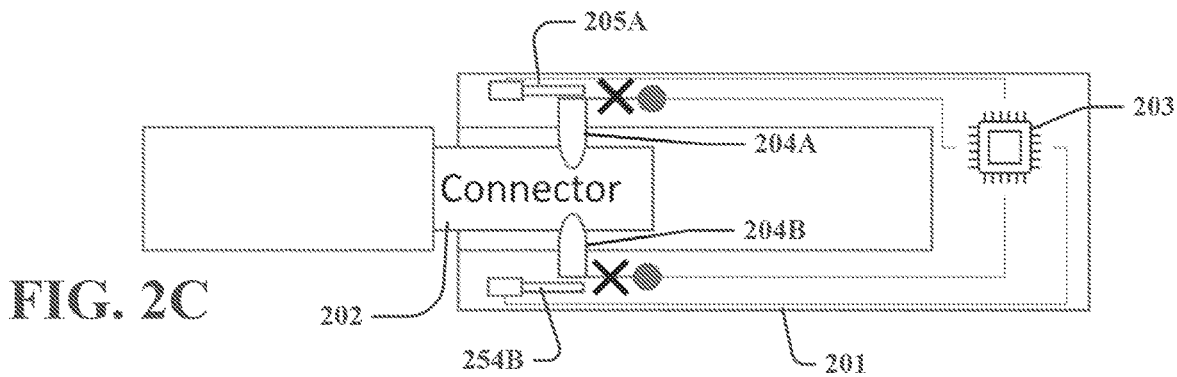
Figure 2D:
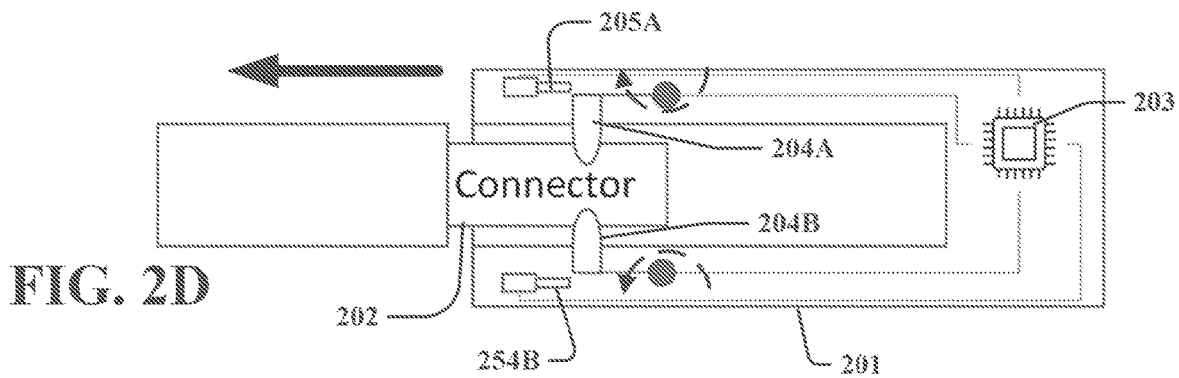

Referring now to FIGS. 2A-2E, these are diagrams illustrating example, non-limiting embodiments of various data connector configurations. More particularly, as shown in FIG. 2A, a female port 201 can receive therein a data connector 202. The female port 201 includes a microprocessor 203 in operative communication with micro-actuators 205A, 205B and detectors (not shown) that detect the positions of pins 204A, 204B. In the condition shown in FIG. 2A, the extendible portions of the micro-actuators 205A, 205B are retracted and the connector 202 is in the process of being inserted into the female port 201. At this stage the connector 202 has not yet passed the pins 204A, 204B. As the data connector 202 is inserted further to the right, the pins 204A, 204B are deformed (see the two dashed curved arrows), allowing port microprocessor 203 to know that a connection is in progress. As seen in FIG. 2B, the condition is now such that the data connector 202 has been inserted sufficiently far into the female port 201 so that the pins 204A, 204B are alongside the data connector 202. In this condition, the pins 204A, 204B are biased against the data connector 202 (see the two dashed curved arrows). As seen in FIG. 2C, the condition is now such that the data connector 202 has been inserted sufficiently far into the female port 201 so that the pins 204A, 204B have lined up with (and moved into) the openings (not shown) in the data connector 202. Also, at this stage the extendible portions of the micro-actuators 205A, 205B are extended, thus blocking pins 204A, 204B from again deforming and moving out of the openings (see the two X's) and effectively locking the data connector 202 in the female port 201. In one example, had the data connector 202 not included openings for the pins 204A, 204B to move into, electrical connectivity could nevertheless have been established and the microprocessor 203 would know that data connector 202 is a non-securable connector (in various examples, in the case of a non-securable connector, access can be profile driven such as denial of data service, denial of high-power). Other factors and considerations can be taken into account for determining whether access is provided to the non-securable connector. As seen in FIG. 2D, the condition is now such that the data connector 202 is being removed from the female port 201. At this stage the extendible portions of the micro-actuators 205A, 205B are again retracted, thus permitting pins 204A, 204B to deform and move out of the openings (see the two dashed curved arrows). This condition can be detected as an in-progress removal. In various embodiments, there can be a manual override such as an opening through which a key or other implement can be passed to manually release (or otherwise push out of the pin openings) the pins. In other embodiments, there is no manual override (embodiments that have no manual override can beneficially maximize security by reducing the ability to perform an unauthorized unlocking).

Still referring to FIGS. 2A-2D, in one example these can be considered side views—wherein the pins 204A, 204B are disposed respectively along the top and bottom of the data connector 202. In another example these can be considered top views—wherein the pins 204A, 204B are disposed respectively along the sides of the data connector 202. In various examples, the pins 204A, 204B can be shaped in order to ease movement around, into, and out of the data connector 202 (for instance, the surfaces of the pins 204A, 204B can be angled, slanted, curved, or any combination thereof).

Figure 2E:
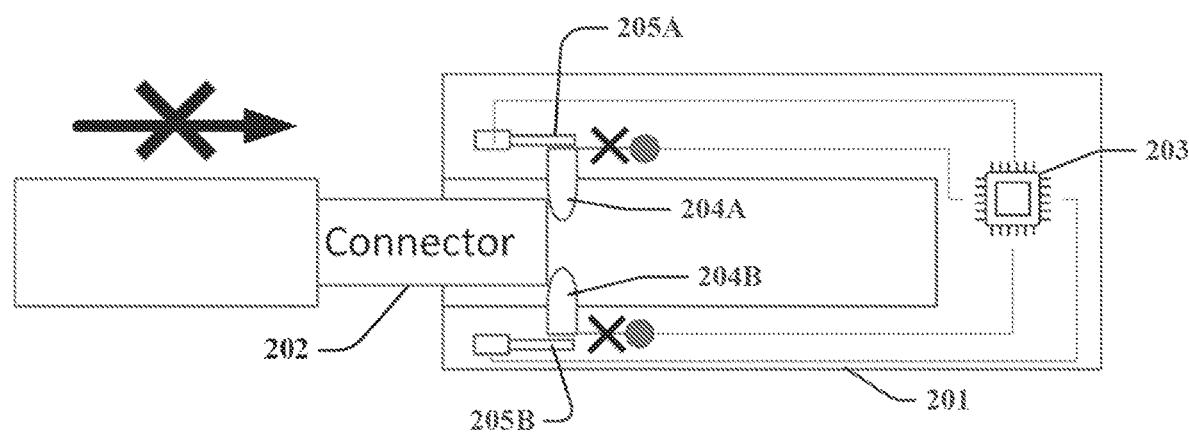

Referring now to FIG. 2E, this figure shows a condition in which data connector 202 can be locked-out of female port 201. In this condition, the extendible portions of the micro-actuators 205A, 205B are extended (before the data connector 202 has passed by the pins 204A, 204B), thus blocking pins 204A, 204B from deforming (see the two small X's) and effectively locking-out the data connector 202 from the female port 201 (see the large X).

Figure 3:
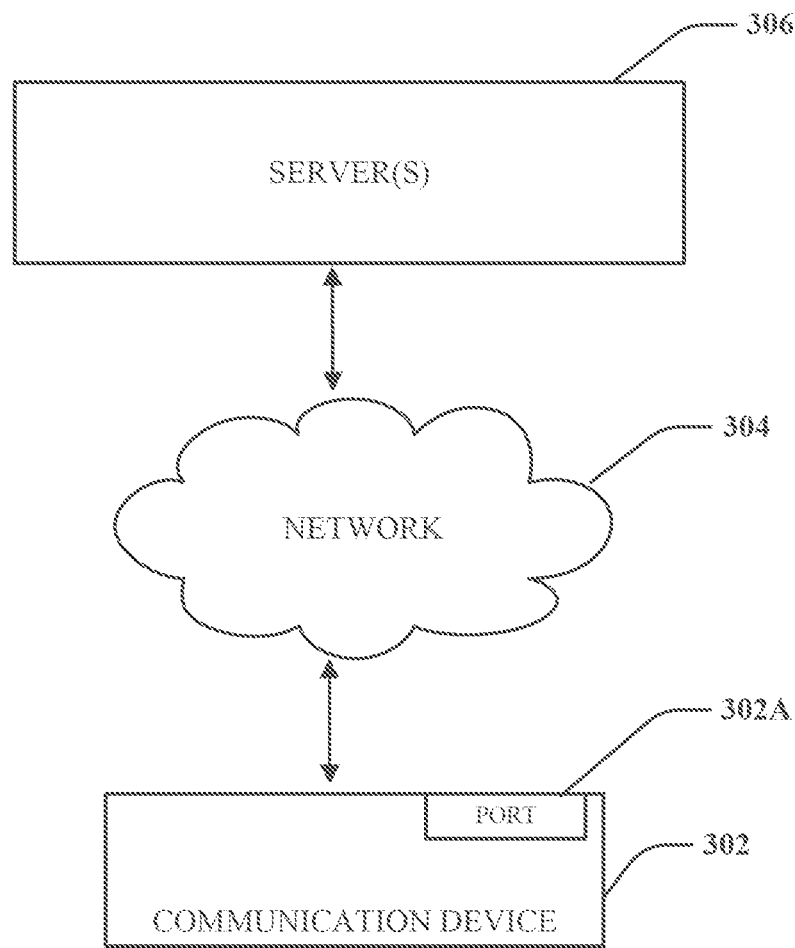
FIG. 3 is a block diagram illustrating an example, non-limiting embodiment of a data connector configuration that is utilized in a communication network in accordance with various aspects described herein.

Referring now to FIG. 3, this is a block diagram illustrating an example, non-limiting embodiment of a data connector configuration that is utilized in a communication network in accordance with various aspects described herein. More particularly, communication device 302 (which can comprise a desktop computer, a laptop computer, a notebook computer, a tablet computer, a smartphone, or any combination thereof) is in operative communication via network 304 with one or more servers 306. The communication device 302 can include a port 302A, such as a female port as described herein. The port of the communication device can be configured to provide various securing functionality (e.g., lock-in, lock-out, insertion detection, removal detection) as described herein. The port of the communication device can be configured to receive instructions from and/or send detection data to the one or more servers 306. In various examples, the instructions received from the one or more servers 306 can cause the port to lock-in a connector or lock-out a connector. In various examples, the detection data to the one or more servers 306 can indicate that a connector is being inserted into the port, that a connector is fully inserted into the port, that a connector is being removed from the port, or that a connector is fully removed from the port. In various examples, the network 304 can comprise a local area network (LAN), a wide area network (WLAN), the Internet, or any combination thereof. In various examples the communication between the communication device 302 and the one or more servers 306 can be bi-directional and can comprise wired communication, wireless communication, or any combination thereof. In various examples the connectors can comprise wired connectors, wireless connectors, memory sticks, or any combination thereof.

Figure 4:
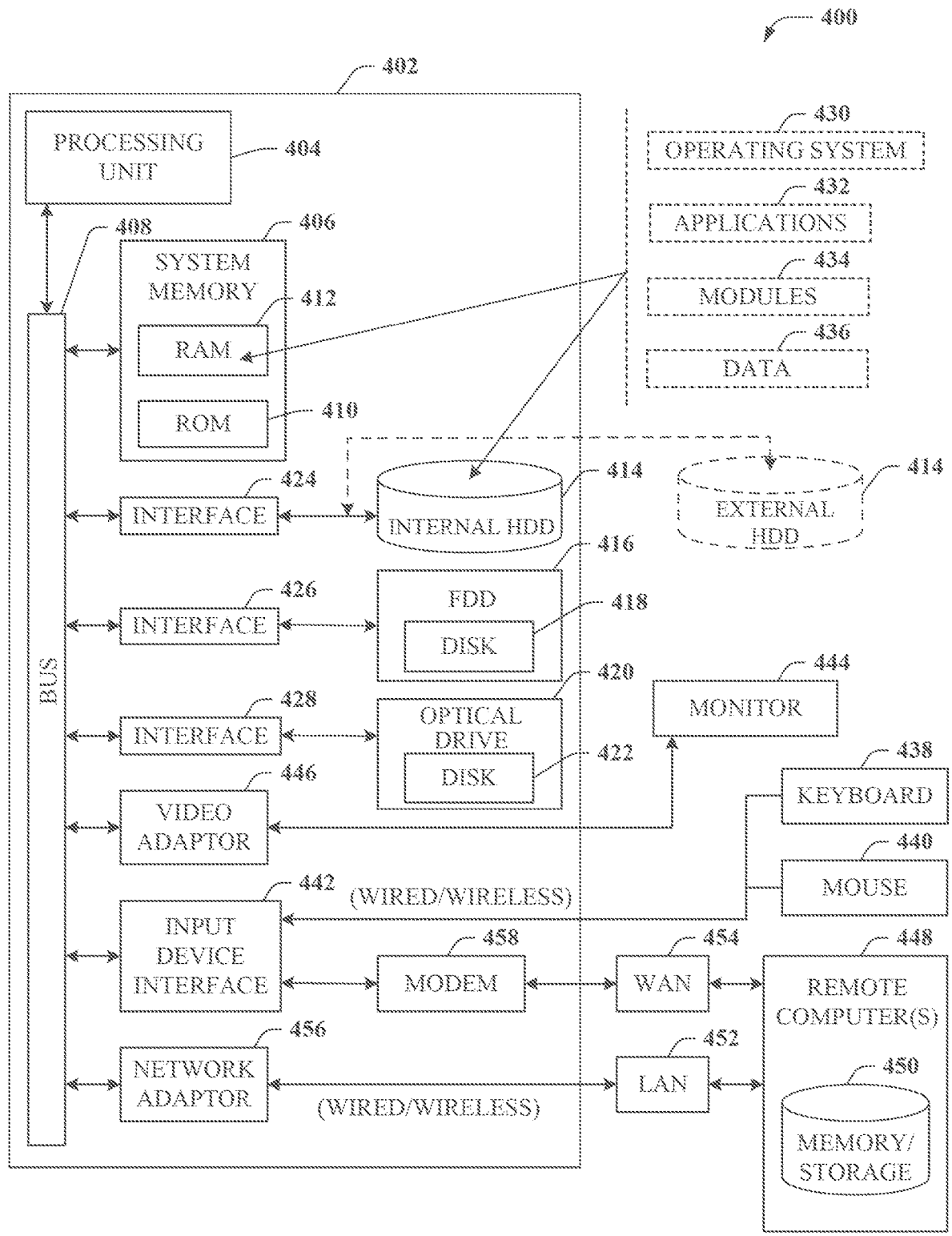
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of port control and/or connector state detection as described herein. Various features can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD)

416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5A:
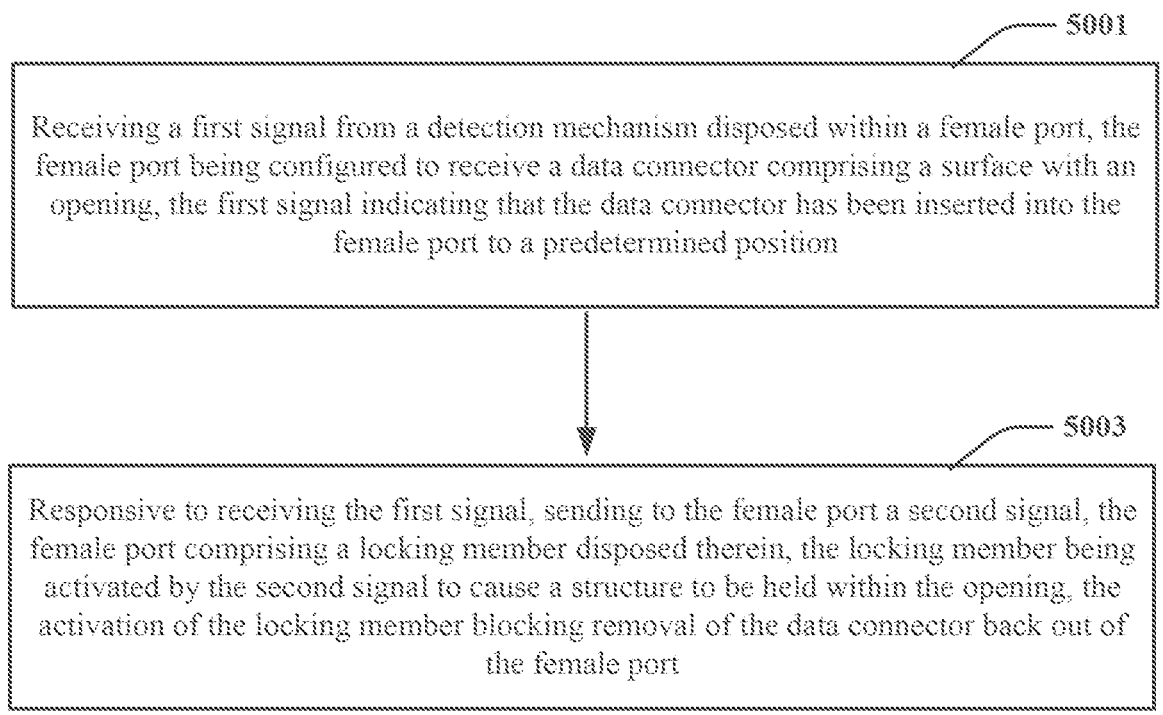
FIG. 5A depicts an illustrative embodiment of a method in accordance with various aspects described herein.

Referring now to FIG. 5A, various steps of a method 5000 according to an embodiment are shown. As seen in this FIG. 5A, step 5001 comprises receiving a first signal from a detection mechanism disposed within a female port, the female port being configured to receive a data connector comprising a surface with an opening, the first signal indicating that the data connector has been inserted into the female port to a predetermined position. Next, step 5003 comprises responsive to receiving the first signal, sending to the female port a second signal, the female port comprising a locking member disposed therein, the locking member being activated by the second signal to cause a structure to be held within the opening, the activation of the locking member blocking removal of the data connector back out of the female port.

While for purposes of simplicity of explanation, the respective processes are shown and described as a series of blocks in 5A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5B:
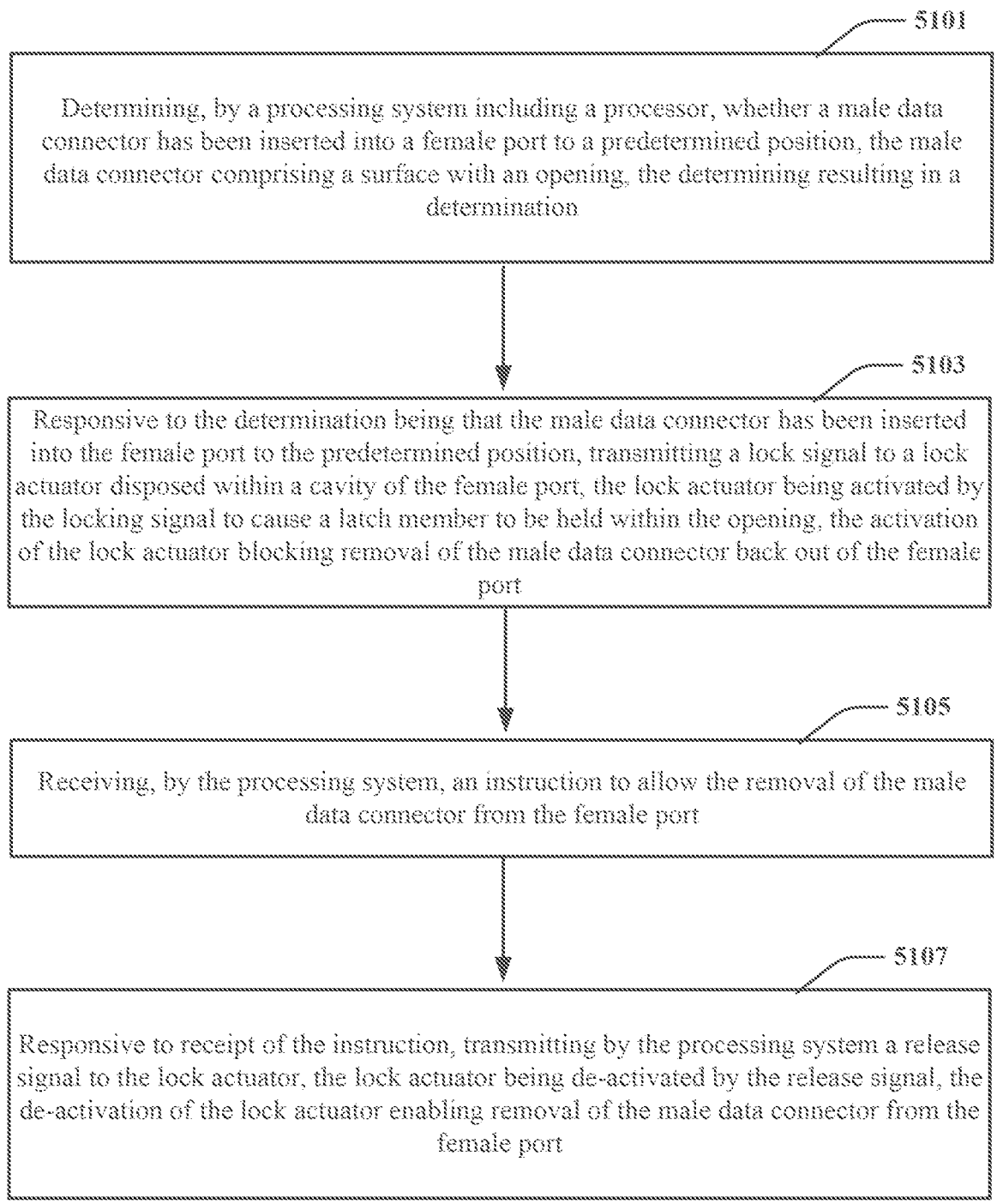
FIG. 5B depicts an illustrative embodiment of a method in accordance with various aspects described herein.

Referring now to FIG. 5B, various steps of a method 5100 according to an embodiment are shown. As seen in this FIG. 5B, step 5101 comprises determining, by a processing system including a processor, whether a male data connector has been inserted into a female port to a predetermined position, the male data connector comprising a surface with an opening, the determining resulting in a determination. Next, step 5103 comprises responsive to the determination being that the male data connector has been inserted into the female port to the predetermined position, transmitting a lock signal to a lock actuator disposed within a cavity of the female port, the lock actuator being activated by the locking signal to cause a latch member to be held within the opening, the activation of the lock actuator blocking removal of the male data connector back out of the female port. Next, step 5105 comprises receiving, by the processing system, an instruction to allow the removal of the male data connector from the female port. Next, step 5107 comprises responsive to receipt of the instruction, transmitting by the processing system a release signal to the lock actuator, the lock actuator being de-activated by the release signal, the de-activation of the lock actuator enabling removal of the male data connector from the female port.

While for purposes of simplicity of explanation, the respective processes are shown and described as a series of blocks in 5B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide for securing a USB-C connector to a port. This can be important, as the new USB-C 2.1 standard supports 48 v, 5 A (240 w) connections and can physically arc and/or damage connections if removed unexpectedly.

As described herein, various embodiments can be used in the context of any desired port type, for example: USB-C; USB-A (still commonly used, same physical/logical security as USB-C); HDMI; Ethernet; any combination thereof.

As described herein, various embodiments can facilitate security standards and/or personal preference to lock devices into ports (e.g., provide a secure physical connectivity path).

As described herein, various embodiments can facilitate security standards and/or power protection and/or personal protection to lock devices out of ports (e.g., address a "fork in plug socket" type concern).

As described herein, various embodiments can prevent the sending of excessive power or data over a questionable cable.

As described herein, various embodiments can provide a port controller. In various examples, control of a port can utilize connectivity/management/control through BIOS settings, Bluetooth, WiFi, or other networked API, or for wall mounted/brick sockets, a physical or logical button on the device. In various examples, port control can comprise instructions to: pre-lock (prevent entry), allow insert-then-lock, remotely lock or release via local or remote command, or any combination thereof. In various examples, port control can be implemented as "secured device" function as lock before insert, preventing storage or other devices from being connected at all (in another example, port control can be used as "child safety" in wall mounted/brick sockets). In various examples, port control can be implemented as "secure USB storage", which can be implemented as insert-then-lock (and/or pre-lock, remote unlock, lock-after insertion), with a remote unlock when storage is scanned prior to unlocking. In various examples, port control can be implemented as "secure port", wherein end user can locally request keyboard/mouse dongle be locked in to avoid loss (in another example, port control can be used as "child safety" to prevent cords from being pulled from wall mounted sockets). In various examples, port control can be implemented as a security lock, to prevent theft of connected device or port host itself (in another example, port control can prevent unexpected removal when secured by triggering local and/or network-based alarm, and/or automated response). In various examples, port control can provide for detecting "securability of connection" and may only accept or transmit lower power (e.g., 5V vs. 20V/48V, or max 2 Aa vs 3 Aa/5 A if connection is not securable to avoid arcing). In various examples, port control can provide for a device to be configured for power events (e.g., fail secured, fail unsecured). In various examples, port control can be implemented by remote commands to the port that can be from a centralized business device or end user remote app (in another example, port control can be implemented by a user pushing a button on the device, based on a variety of factors).

As described herein, various embodiments can provide for port controller linking. In various examples, port controller linking can be provided in the context of single connector devices (e.g., peripheral nubs, flash storage, network connectors)—wherein the device and connection are attached to each other. In various examples, port controller linking can be provided in the context of a cable connecting to the port to connect to the actual peripheral or powered device. In various examples, port controller linking can be provided in the context of multiple port controllers that can communicate with each other across a cable (e.g., detect other end's mechanical security capabilities and cable securing features). In various examples, port controller linking can be provided in the context of chaining security requirements to port at other end of cable, securing physical connection (for instance: force locking/unlocking at remote end, confirmation before activity; can also attempt to do so through hubs or other physical transports; can mechanically lock all devices (as needed) to hub; can trigger "virtual physical security", partitioning or blocking data from other devices on hub to port controller host). In various examples, port controller linking can be provided to prevent damaged cables from being used.

As described herein, various embodiments can provide for power supply port control. In various examples, power supply port control can prevent connections from being made (e.g., make a port child tamper proof, prevent unauthorized siphoning of power). In various examples, power supply port control can facilitate detecting removal of a cable in progress with sufficient time to reduce voltage and/or amperage to avoid arc and/or shock. In various examples, power supply port control can prevent non-rated and/or non-approved cables from being used. In various examples, power supply port control can use "alternate" location(s) for openings (e.g., hole, notch, or the like)—for instance, locations of openings can be used to identify original equipment manufacturer (OEM) connector/power and alter port behavior accordingly.

As described herein, various embodiments can provide for securable USB connections.

As described herein, various embodiments can facilitate security control of a port to prevent unauthorized and/or accidental insertion/removal of a connector (e.g., a USB-C connector).

As described herein, various embodiments can provide for physical modification to a USB-C connector to support: (a) detecting that the connector is mechanically securable; (b) mechanically secure the port—prevent cable from being removed (insert-locked and later unlock, insert-unlocked and later lock/unlock); and/or (c) detecting an unlocked connector is being removed before it is completely removed.

As described herein, various embodiments can provide for modification to a USB-C port to support: (a) detecting that a mechanically securable connector is being inserted (vs. conventional "normal cable"); (b) mechanically securing the connector in the port (initially, after the insertion); (c) mechanically unsecuring the connector in the port (initial, after the insertion); (d) detecting that the cable is being removed before it is completely removed; (e) using mechanical security to prevent a connector (securable or unsecurable) from being inserted into the port; and/or (f) electronics, API, and security sufficient to detect, initiate and/or release port securing.

As described herein, various embodiments can provide for openings in different places on the data connector (e.g., such as to enable detection of a manufacturer based upon a number of the openings and/or based upon locations of the openings).

As described herein, various embodiments can provide for remote lock/unlock, local lock/unlock, manual lock/unlock, or any combination thereof.

As described herein, various embodiments can be provided in the context of a USB drive (e.g., physical security).

As described herein, various embodiments can provide for a computer operating system to take action(s) upon insertion of a data connector into a port and/or upon removal of a data connector from a port.

As described herein, various embodiments can be provided in the context of one or more port replicators.

As described herein, various embodiments can provide certain defaults. For example, a port can default to open or a port can default to closed.

As described herein, various embodiments can provide for securely locking-out use of a USB connector in a phone.

As described herein, various embodiments can provide for protecting power and/or protecting data.

As described herein, various embodiments can provide for locking-out a power connector (e.g., in the context of a cable box).

As described herein, various embodiments can detect presence of a particular connector in a port by mechanical contact and/or by optical detection.

As described herein, various embodiments can provide for encoding of information based upon the number and/or location(s) of the openings (e.g., encode power level such as high power or low power).

As described herein, various embodiments can provide for proper shutdown of a device or computer based upon a connector being removed from a port (for instance, based upon detection by a sensor at the edge of the port of the connector being removed from the port (but prior to complete removal), an operating system can be shut down or a file can be closed).

As described herein, various embodiments can provide for lockable cables, lockable port replicators, and/or lockable thumb drives.

As described herein, various embodiments can provide for locking mechanism that that act like a chain of custody.

As described herein, various embodiments can provide for configurations to fail secured (e.g., connector is locked in the port in the event of a power loss) and/or fail unsecured (e.g., connector is not locked in the port in the event of a power loss).

As described herein, various embodiments can provide for port behavior based upon a security profile (for instance, a security profile of a smartphone can command a port to physically prohibit a USB C cable from being attached).

As described herein, various embodiments can provide for port behavior that makes a cable connecting a smartphone to a laptop unremovable from both (e.g., making the smartphone and the laptop inseparable until commanded otherwise).

As described herein, various embodiments can provide for port behavior with respect to power cables.

As described herein, in various embodiments lock-out and/or lock-in can be controlled (e.g., by a processor) such as based on a detected security threat that copying of files is about to occur.

As described herein, in various embodiments lock-out and/or lock-in can be controlled according to instructions from another device. In one example, a user's mobile phone (or other multi-factor authentication) locks-out any/all ports on a desktop computer so that other data connectors cannot be connected without authorization. In one example, a user's mobile phone (or other multi-factor authentication) locks-in any/all connectors on a desktop computer so that data connectors cannot be disconnected/removed without authorization.

As described herein, in various embodiments a file copy operation that violates security policy can be used to trigger a port lockdown (e.g., preventing the cable/storage from being removed until such time as it is released by the operating system (OS)/remote command). In one example, the operating system (OS) can keep track of privileged files and once the files have been securely deleted the port can unlock.

As described herein, in various embodiments a remote authority can be a personal mobile device. In one example, a proximal beacon (e.g., akin to a Bluetooth, WIFI, or other proximal beacon) can be used (such as in addition to a multi-factor authentication).

As described herein, in various embodiments with a sufficiently reinforced cable/port, the secure connection can also double as a security lock to prevent theft.

As described herein, in various embodiments there can be centralized and/or remote locking/unlocking.

As described herein, in various embodiments the release/lock signals can be communicated elsewhere so that it is known when the connector is being used and/or being removed. In one example, communications can be provided to one or more other processors of the computer (e.g., other than microprocessor 203 of FIGS. 2A-2E). In one example, communications can be provided to one or more other processors of one or more other devices (such as to the user's mobile phone) to let the user know that someone has connected a connector (e.g., a memory stick) to their desktop computer.

As described herein, in various embodiments a securing/locking mechanism can be added to a connector/port that conforms to a USB standard (e.g., a USB Type-C® 2.1 standard).

As described herein, in various embodiments a securing/locking mechanism can be added to a connector/port that conforms to an HDMI standard.

As described herein, in various embodiments (e.g., in the context of Ethernet) a host+router can be utilized for physically securing network connection.

As described herein, in various embodiments (e.g., in the context of Ethernet) a pin behind a clip can be utilized for securing/locking. In various examples, a pin behind a clip can provide securing/locking even if the clip is broken.

As described herein, in various embodiments a mechanism can detect if securable or not by presence of nub (e.g., mechanical/optical detection).

As described herein, in various embodiments a mechanism can secure/lock a device (e.g., a USB drive or wireless dongle) that is added to a computer. In one example, a user can secure/lock the device (personal security). In another example, external management can be applied before a device is released.

Figure 6:
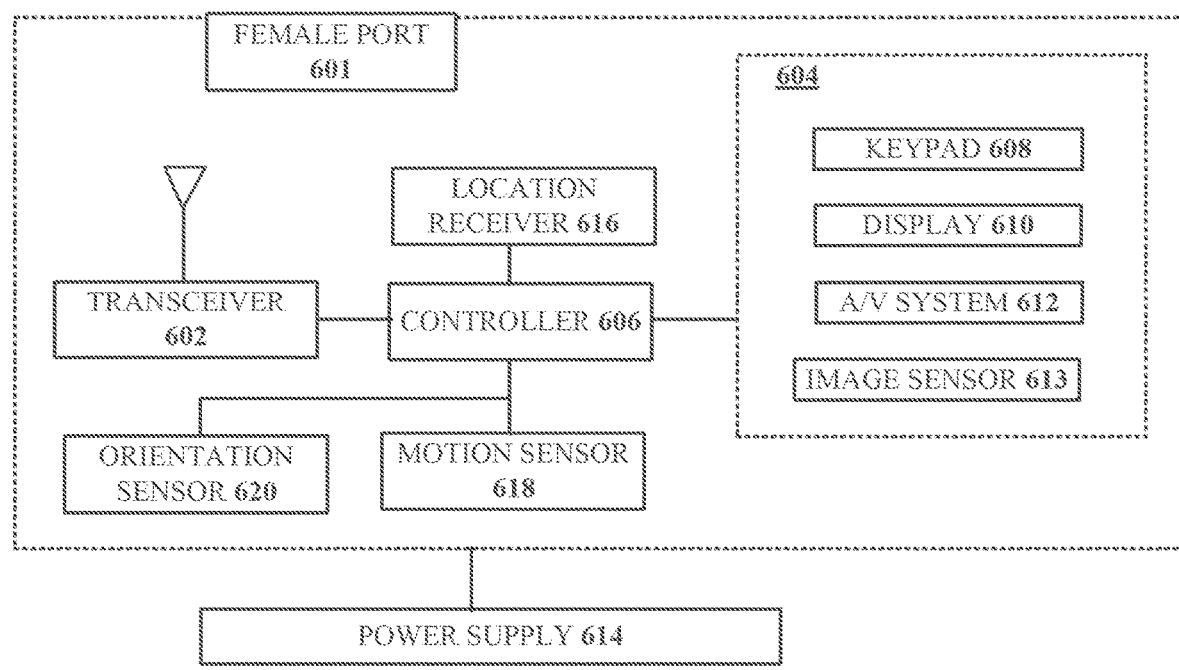
FIG. 6 is a block diagram of an example, non-limiting embodiment of a communication device in accordance with various aspects described herein.

Turning now to FIG. 6, an illustrative embodiment of a communication device 600 is shown. The communication device 600 can comprise a female port 601. The female port 601 can be configured for receiving a data connector (not shown) as described herein. In one example the female port can comprise a USB port and the data connector can comprise a male USB connector. In another example, the USB port and the USB connector can each conform to a USB-C 2.1 standard. In another example, the communication device 600 can comprise a desktop computer, a laptop computer, a notebook computer, a tablet computer, a smartphone, or any combination thereof.

Still referring to FIG. 6, the communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically controlling a port to lock-in or lock-out a data connector) can employ various AI-based schemes for carrying out various embodiments thereof. Moreover, the classifier can be employed to determine a ranking or priority of a particular connector to lock-in or lock-out. A classifier is a function that maps an input attribute vector, $x=(x_1, x_2, x_3, x_4 \ldots x_n)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the ports to lock-in or lock-out, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a female port configured to receive a data connector, the data connector comprising a surface with a first opening;
a first movable member disposed within the female port, the first movable member being configured such that as the data connector is moved into the female port a first portion of the first movable member enters into the first opening;
a first blocking member disposed within the female port, the first blocking member being configured to move to a first blocking position to block the first portion of the first movable member from exiting the first opening after the first portion of the first movable member has entered the first opening; and
a micro-switch that is disposed within the female port and that is in contact with the first movable member to detect whether the first portion of the first movable member has entered into the first opening.

2. The device of claim 1, wherein the female port comprises a Universal Serial Bus (USB) port and the data connector comprises a male USB connector.

3. The device of claim 2, wherein the USB port and the USB connector each conform to a USB-C 2.1 standard.

4. The device of claim 1, wherein the first opening comprises a hole, a notch, an indentation, or any combination thereof.

5. The device of claim 1, wherein:
the first movable member comprises an elongated flexible portion having one end and another end;
the first portion of the first movable member is located at the one end of the elongated flexible portion; and
the another end of the elongated flexible portion is fixed to an inside of the female port.

6. The device of claim 5, wherein the elongated flexible portion of the first movable member biases the first portion of the first movable member towards the surface of the data connector to cause the first portion of the first movable member to enter into the first opening in the surface of the data connector.

7. The device of claim 5, wherein the first blocking member is further configured to move to an unblocking position such that the first portion of the first movable member can exit from the first opening as the data connector is removed from the female port.

8. The device of claim 1, wherein the first blocking member is part of a micro-actuator.

9. The device of claim 1, wherein the first portion of the first movable member has a structural configuration to allow the first portion of the first movable member to be pushed out of the first opening as the data connector is removed from the female port.

10. The device of claim 1, further comprising:
a processing system including a processor; and
a memory that stores executable instructions that, when executed by the processing system, facilitate performance of operations, the operations comprising:

detecting, via a detection mechanism comprising the micro-switch, whether the first portion of the first movable member is in the first opening, resulting in a detection; and
responsive to the detection, taking an action.

11. The device of claim 10, wherein:
responsive to the detection being that the first portion of the first movable member is in the first opening, the action comprises permitting a flow of electric current between the female port and the data connector.

12. The device of claim 10, wherein:
responsive to the detection being that the first portion of the first movable member is not in the first opening, the action comprises prohibiting a flow of electric current between the female port and the data connector.

13. The device of claim 1, wherein the surface of the data connector comprises a second opening, and wherein the device further comprises:
a second movable member disposed within the female port, the second movable member being configured such that as the data connector is moved into the female port a second portion of the second movable member enters into the second opening; and
a second blocking member disposed within the female port, the second blocking member being configured to move to a second blocking position to block the second portion of the second movable member from exiting the second opening after the second portion of the second movable member has entered the second opening.

14. A non-transitory machine-readable medium comprising executable instructions that, when executed by a processing system including a processor, facilitate performance of operations, the operations comprising:
receiving a first signal from a detection mechanism disposed within a Universal Serial Bus (USB) port, the USB port being configured to receive a USB connector comprising a surface with an opening, the first signal indicating that the USB connector has been inserted into the USB port to a predetermined position; and
responsive to receiving the first signal, sending to the USB port a second signal, the USB port comprising a locking member disposed therein, the locking member being activated by the second signal to cause a structure to be held within the opening, the activation of the locking member blocking removal of the USB connector back out of the USB port.

15. The non-transitory machine-readable medium of claim 14, wherein the operations further comprise:
determining whether the USB connector is allowed to be removed from the USB port, resulting in a determination; and
responsive to the determination being that the USB connector is allowed to be removed from the USB port, sending a third signal to the USB port, the locking member being de-activated by the third signal, the de-activation of the locking member permitting removal of the USB connector back out of the USB port.

16. The non-transitory machine-readable medium of claim 15, wherein the structure blocks removal of the USB connector back out of the USB port via an interference fit with the opening.

17. A method comprising:
determining, by a processing system including a processor, whether a male Universal Serial Bus (USB) connector has been inserted into a USB port to a predetermined position, the male USB connector comprising a surface with an opening, the determining resulting in a determination;

responsive to the determination being that the male USB connector has been inserted into the USB port to the predetermined position, transmitting a lock signal to a lock actuator disposed within a cavity of the female USB port, the lock actuator being activated by the locking signal to cause a latch member to be held within the opening, the activation of the lock actuator blocking removal of the male USB connector back out of the female USB port;

receiving, by the processing system, an instruction to allow the removal of the male USB connector from the female USB port; and responsive to receipt of the instruction, transmitting by the processing system a release signal to the lock actuator, the lock actuator being de-activated by the release signal, the de-activation of the lock actuator enabling removal of the male USB connector from the female USB port.

18. The method of claim 17, wherein:
the instruction to allow the removal of the male USB connector from the female USB port is received via user input, via a remote device, or any combination thereof.

19. The non-transitory machine-readable medium of claim 14, wherein the USB port and the USB connector each conform to a USB-C 2.1 standard.

20. The method of claim 17, wherein the female USB port and the male USB connector each conform to a USB-C 2.1 standard.

* * * * *